Jan. 13, 1970 L. K. WANLASS 3,489,970
MAGNETIC CORE TUNABLE CIRCUIT
Original Filed May 14, 1965 4 Sheets-Sheet 1

INVENTOR
LESLIE KENT WANLASS
BY Lyon & Lyon
ATTORNEYS

MAGNETIC CORE TUNABLE CIRCUIT

Original Filed May 14, 1965 4 Sheets-Sheet 2

INVENTOR
LESLIE KENT WANLASS
BY Lyon & Lyon
ATTORNEYS

INVENTOR
LESLIE KENT WANLASS
BY Lyon & Lyon
ATTORNEYS

MAGNETIC CORE TUNABLE CIRCUIT
Original Filed May 14, 1965 4 Sheets-Sheet 4
FIG. 10.
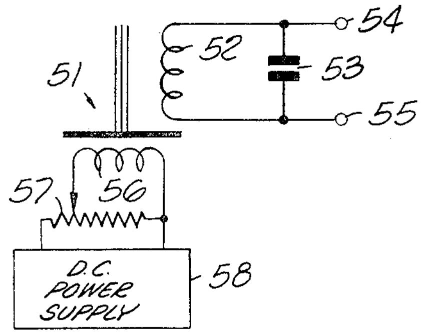
FIG. 11A. FIG. 11C.
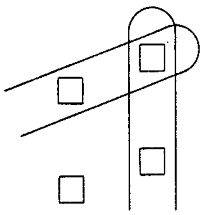
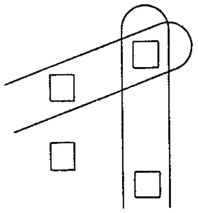
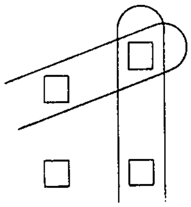
FIG. 11B.
INVENTOR
LESLIE KENT WANLASS
BY Lyon & Lyon
ATTORNEYS 3,489,970
MAGNETIC CORE TUNABLE CIRCUIT Leslie K. Wanlass, Newport Beach, Calif., assignor, by mesne assignments, to Wanlass Electric Company, Santa Ana, Calif., a corporation of California Original application May 14, 1965, Ser. No. 455,939, now Patent No. 3,403,323. Divided and this application Aug. 5, 1968, Ser. No. 750,160
Int. Cl. H03j *3/02*
U.S. Cl. 334—12 8 Claims

ABSTRACT OF THE DISCLOSURE

A tunable circuit comprising a capacitor and an inductor, the impedance of which can be electrically varied. The inductor comprises a first winding wound on a magnetic core having a four legs or common regions joined by end regions. A source of control current is connected to another winding wound on the core generally transverse to the first winding, the control current in the second winding controlling the inductance of the first and hence controlling the frequency to which the circuit is tuned.

CROSS REFERENCES TO RELATED APPLICATIONS

This is a division of my copending application Ser. No. 455,539, filed May 14, 1965, for "Electrical Energy Translating Devices and Regulators Using the Same," now Patent No. 3,403,323, which is a continuation-in-part of my application Ser. No. 857,083, filed Dec. 3, 1959, for "Ferromagnetic Signal Transfer Device," now abandoned, the disclosures of which are incorporated by reference herein.

The properties of ferromagnetic materials have long been utilized in the design and construction of components for electrical circuitry. Signal translating devices which make use of the property of magnetization range from a simple inductor comprising a coil wrapped around a ferromagnetic core to complicated magnetic amplifiers and saturable transformers. Such devices are particularly useful because they permit the easy control of their primary electrical characteristics. This control, moreover, is itself electrical and thus permits a wide selection of control functions. For example, if it is desired to control the average impedance in a line, a saturable reactor can be utilized and the average impedance of the reactor of the line signal varied as a function of a DC control current applied to the control winding of the reactor. The principle of operation of such saturable reactors is well known and they are widely used. On the other hand, if it is desired to electrically control the coupling between primary and secondary windings of a transformer, they can be wound around a core and the flux linkage controlled by the current applied to a control winding. Ordinarily, this control is exercised by varying the flux density of a shunt leg of the core positioned between the primary and secondary legs to cause differing amounts of flux from the primary to traverse the shunt leg.

In both the saturable reactor and the saturable transformer discussed above, control depends upon the core being driven into saturation. This switching type operation results in distortion which in many cases is unacceptable. In order to increase the power capacity of such devices, the art has turned to larger and larger volume cores so that the range of signals that can be handled is increased. Regardless of the size of the cores, however, such devices cannot provide control over a large range and invariably introduce unacceptable distortion into the line signal. Moreover, precautions must be taken to insure that the AC signal, in the load winding, in the case of a saturable reactor, and the primary winding in the case of a saturable transformer, does not induce a large signal in the DC control winding. This is generally prevented by providing a pair of AC windings which are so related to the DC winding that the AC fluxes generated by them are cancelled out. While this is satisfactory, it further adds to the size, cost and complexity of the device.

According to the present invention, signal translating devices are provided which overcome the major disadvantages of previously known magnetic core devices. The devices of the present invention are arranged such that operation takes place without the requirement of saturating the magnetic circuit and consequently distortion can be greatly reduced in the signal translation. In addition, the range of control of the present devices is very much greater than those devices presently known. The present devices may be made much smaller in size, less complex, and consequently less expensive than presently obtainable devices. All of these desirable features result from the provision of devices having cores in at least one portion of which a control current generated flux component and an AC generated flux component are in opposition at all times, i.e., on both halves of the AC cycle. As a result, the complete path of the AC flux within the core is not saturated and the composite B–H characteristic of the core can be maintained within its non-saturated region. Since these two flux components always are in opposition in at least one portion of the path of the AC generated flux component, an increase in control current which may, for example, be DC means that an increase in AC current can be tolerated without distorted. This is, of course, opposite to the situation present in the present day devices where a larger DC current means that the AC signal must be correspondingly reduced.

Because the sense of the AC generated flux component reverses every half cycle, and the sense of a DC generated flux component remains constant, in order to have a core having at least one portion in which at all times the DC flux component and the AC flux component are in opposition, it is necessary to provide the core with four regions in which both the AC and the DC flux components appear and two end or joining portions for magnetically coupling the common regions. For the sake of convenience, the common regions will hereafter be referred to as "legs" although it should be understood that it is not necessary to have a structure in which actual structurally identifiable legs are present. By properly positioning a pair of coils on such a core, a DC flux component can be caused to follow paths through legs 1 and 2 and through legs 3 and 4 and through legs 2 and 3. The AC flux component, of course, reverses its direction each half cycle. These relationships will be described in greater detail in connection with the drawings.

On each half cycle, however, AC and DC flux components will exist in each leg and will be in opposition in a first pair of diagonal legs and in addition in the other pair of diagonal legs. For example, for a first sense of the AC flux component, legs 1 and 3 may have the AC and DC flux components in opposition while legs 2 and 4 will have these flux components in additive relationship. It can thus be seen that each of the two legs in each of the paths of the AC flux will be at different points on the magnetization curve of the core material. The leg in which the flux components are additive (the additive leg) will be relatively far out on the magnetization curve and consequently will have a lower permeability and a higher reluctance while the leg in which the flux components are in opposition (the bucking or opposing leg) will have a higher permeability and a lower reluctance. As used in this specification, the terms "higher" and "increased" and "lower" and "decreased" as applied to permeability and reluctance are, of course, meant to be relative to the permeability and reluctance of the core when only the larger flux is present, or to state it another way, "lower" or "reduced" reluctance means the reluctance is closer to the nominal reluctance of the core material and "higher" or "increased" reluctance means the reluctance is further from the nominal reluctance.

Since the total magnetic circuit encompassed by the load winding will include an additive leg and a bucking leg, the composite B–H characteristic of the circuit will be a composite of the two and will have a lower average permeability than would the same path without the presence of the DC flux component. The average permeability of the path will decrease as the DC flux component is increased and consequently the composite B–H curve will be caused to rotate in a clockwise direction. Such a rotation indicates a decrease in average permeability and a corresponding decrease in average inductance presented to the AC or load winding, and consequently it can be seen that by increasing the DC flux component, the inductance presented to the load winding is decreased. The device of the present invention can thus be likened to a conventional ferromagnetic core having a variable air gap therein.

When constructing a variable inductance device in accordance with the present invention, the AC winding and the DC winding are preferably positioned on the core so that there is little or no voltage induced in the DC winding over the preferred operating range. This is conveniently done by positioning the windings at right angles, that is, with their axes transverse. As pointed out above, in one portion of its path, the AC generated flux is called upon to travel from a leg, for example, leg 4, of high permeability to a leg, leg 1, of low permeability. The flux passing through leg 4 could, however, also complete a path by diagonally crossing the end portion and travelling through high permeability leg 2 instead of low permeability leg 1. Since reluctance to magnetic flux can be approximately expressed as:

$$R=\frac{1}{uA}$$

where:

R=Reluctance
$l$=Length of path
$u$=Permeability
A=Area of the path it can be seen that if the DC flux component is made high enough, a point will be reached as the AC flux component increases where the permeability in leg 2 will be sufficiently lower than the permeability in leg 1 that the differences in the length of the path between leg 4 and leg 1 and leg 4 and leg 2 will be overcome and some of the flux from leg 4 will complete its path through leg 2.

As a result of this "crossover" flux, an AC voltage will be induced in the DC winding. For low values of DC or AC current, however, the effect of this crossover flux will be negligible and will not effect the inductance of the AC winding. The DC winding can be provided with a suitable choke to suppress the AC voltage induced therein as a result of the crossover flux.

According to the present invention a variable transformer can be provided by winding a further winding on the core with its axis parallel to that of the DC winding, this third winding being the secondary of the transformer and the aforementioned AC winding being the primary. In the absence of any DC control current there is substantially no coupling between the primary and the secondary windings because they are wound about transverse axes. As the DC control current is increased, there is an increased transfer of power from the primary to the secondary winding. The operation of such a variable transformer can best be explained in the following manner.

Consider that the primary current sets the level of the inductance of the secondary winding. As the primary current increases, the inductance of the secondary winding decreases and the voltage induced therein increases since:

$$V_s=-\frac{d\phi_s}{dt}$$

$$\phi_s=\frac{L}{N}i_s$$

$$V_s=-\frac{d\phi_s}{dt}=-\frac{1}{N}\left(L\frac{di_s}{dt}+i_s\frac{dL}{dt}\right)$$

If the frequency of the control voltage is much less than the frequency of the primary, $$L\frac{di_s}{dt}$$

becomes inconsequential. Therefore:

$$V_s=-\frac{1}{N}\left(i_s\frac{dL}{dt}\right)$$

It can thus be seen that the voltage induced in the secondary is dependent on the change of inductance which is caused by the fluctuation of the primary current. As the primary current increases, L (of the secondary) decreases and the voltage induced in the secondary increases.

The phenomenon of crossover flux also contributes to the development of a voltage in the secondary winding of the transformer. As the secondary winding is wound with its axis parallel to that of the DC winding, the crossover flux will cut the turns of the secondary winding and induce a voltage therein. As the DC control current becomes greater, the permeability in the various legs will change as will the reluctance of the various paths so that more and more crossover flux is produced as the AC current increases and more and more voltage is consequently induced in the secondary windings. For very high DC and AC flux component values, a significant part of the AC flux can be caused to cross over with a resulting voltage being induced in the secondary winding. It appears, however, that at normal operating levels, the greater portion of the power transfer occurs as a result of the inductance phenomena explained above.

The theories expressed above are believed to describe the physical phenomena present in the system and are believed to be more accurate than those expressed in my abovementioned original application. However, it should be understood that the principles governing the operation of the devices of the present invention have not been completely developed and it is possible that further theoretical bases for operation will be discovered. The theories discussed in this application, and in my original application, should therefore be taken only as the best presently available and are not meant in any way to limit the scope of the present invention.

While the foregoing theoretical description has discussed the devices of the present invention as variable inductors and variable transformers, the devices, by their nature, may be used in many different kinds of circuits, even in circuits where a conventional variable inductor or variable transformer would or could not be used. For example, the variable inductor has been described primarily with regard to a device wherein the impedance presented to an AC load winding is varied by varying the direct current in a control winding. Such a device has obvious utility in regulators and the like. However, there are additional ways in whch the variable inductor could be used. Thus, in addition to the situation where the load signal is AC and the control signal is DC, the load signal could be DC and the control signal AC or both the load signal and the control signal could be AC as will be more fully described.

The variable transformer of the present invention may be operated in either of two modes; a frequency doubling mode and a non-frequency doubling mode. In the first of these modes, the frequency of alternating current signals are doubled in transfer from the primary to the secondary circuit.

The frequency doubling phenomena can also best be explained in terms of inductance. As pointed out above, the primary current sets the level of the inductance of the secondary winding. Inductance is, of course, an absolute quantity and thus the inductance of the secondary winding changes twice for each cycle of primary current and hence the output has a double frequency.

The crossover flux phenomenon also provides a partial explanation of the frequency doubling phenomenon. At proper input levels, when an alternating current signal is applied to the primary winding, a voltage will be induced in the secondary winding at twice the input frequency. This occurs because in each half cycle of the alternating current input, the diagonal path followed by the crossover flux switches; for example, on the first half cycle the flux will cross over from leg 1 to leg 3 while on the second half cycle the flux will switch and cross over from leg 2 to leg 4. However, each of these diagonal paths cuts the secondary winding in the same direction and consequently the voltage induced in the secondary will be in the same direction regardless of the diagonal followed by the crossover flux. The secondary winding thus in effect sees the modified absolute value of the input such as is done by a full wave rectifier. When a modified absolute value is taken of a sine wave, the result is an output waveform with twice the frequency of the input.

Since the alternating flux component in the legs is essential to set up the proper reluctance pattern, the crossover flux is not immediately responsive to the input but rather builds up slowly, as the slope of the output waveform is zero at the time the slope of the input waveform is maximum, that is, when it crosses zero. The same phenomenon also acts at the end of each half cycle of the input with the result that the output waveform is rounded out and has a frequency twice that of the input, although somewhat distorted.

The variable transformer of the present invention can also be operated in a non-frequency doubling mode by establishing a bias flux in the paths followed by the alternating flux of a magnitude sufficient to insure that the direction of the composite bias and alternating flux does not reverse, that is, by setting the magnitude of the bias flux at least as high as the maximum alternating flux.

The non-doubling mode is also explained in accordance with the inductance theory. If the primary flux never crosses zero, there is only one point in each cycle of the input where the inductance of the secondary is a maximum—the peak of the positive going half cycle. Similarly, there is only one point of maximum inductance—the peak of the negative half cycle. Since the control current never changes sign, there is no absolute value taken and consequently the output has the same frequency as the input.

From the standpoint of the crossover flux phenomena, it can be seen that with the high bias flux, the same pair of diagonal legs will always have the lower reluctance and the crossover flux will always follow the same diagonal path. The waveform of the crossover flux will not follow the input current waveform because the lower reluctance of the legs is already established by the primary bias and hence as soon as the alternating flux begins to increase, it will begin to cross over. The crossover flux will rise to a maximum when the alternating current input is at a maximum and follow its decline. When the alternating current passes its zero level, however, the crossover flux will still be in the same diagonal and in the same direction and the output will continue to decrease until the input again begins to increase. This is unlike the non-biased case where the diagonal switched when the input crossed zero and the crossover flux again began to increase.

It is an object of the present invention to provide a magnetic electrical energy translating device in which the magnitude of the energy being translated can be electrically varied.

It is another object of the present invention to provide such a device which is smaller than those presently available but which nevertheless has a greater energy translating capacity.

It is also an object of the present invention to provide such a device which has a greater range through which control can be exercised without unduly distorting the waveform of the input thereto.

It is a further object of the present invention to provide an improved variable inductance device.

It is a still further object of the present invention to provide such a variable inductance device in which the inductance can be varied electrically.

It is yet a further object of the present invention to provide a ferromagnetic variable inductance device the inductance of which can be varied without saturating the device.

It is a still further object of the present invention to provide a tunable electric circuit incorporating such an improved variable inductance device.

It is also an object of the present invention to provide a ferromagnetic control device having a load winding and a control winding in which there is negligible coupling between the windings over the normal operating range.

Other objects and advantages of the present invention will become more apparent upon reference to the accompanying description and drawings in which:

FIGURE 10 is a schematic diagram of variable frequency tuned L–C circuit using the variable inductor of the present invention; and FIGURES 11A, 11B and 11C are schematic representations of cores constructed according to the present invention in which the windings are not arranged at right angles.

Figure 1:
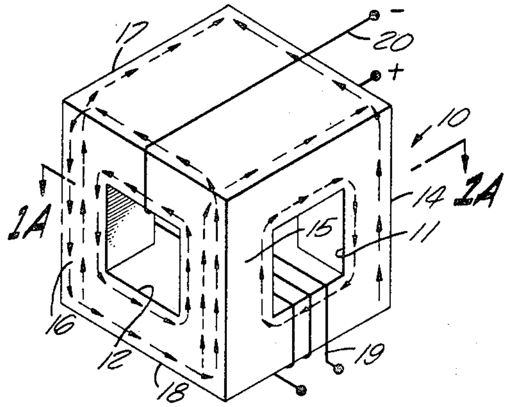
FIGURES 1, 2, 3 and 4 show a first embodiment of the present invention and illustrates the principles of operation thereof.

The principles of operation of the present invention as discussed above may further be explained by reference to FIGURES 1, 1A, 2, 2A, 3,3A, 4 and 4A together with the magnetization curves shown in FIGURES 5A, 5B, 5C and 5D. Since FIGURES 1 through 4 differ only in operating condition, similar elements are identified by the same reference numerals. Referring now to FIGURE 1, a ferromagnetic core 10 is provided with intersecting transverse openings or passageways 11 and 12. The core is thus provided with four legs or common regions 13, 14, 15 and 16, and end or cap regions 17 and 18 which join the legs with a mass of ferromagnetic material. A first winding 19 is wound around the cap region 18 through the opening 11 while a second winding 20 is wound around the cap region 17 through the opening 12.

The following explanation wil discuss the operation of the device in its simplest form, that is, where an alternating current is applied to one winding, for example, the winding 19, and a direct current is applied to the winding 20, the unidirectional flux generated by the current in the winding 20 controlling the permeability of the path followed by the flux generated by the alternating current in the winding 19. It should be understood however, the other combinations of currents could be used as explained above and as further explained below. In this specification, the winding in the circuit being controlled will for convenience often be called the load winding while the winding in the circuit effecting the control will be called the control winding.

Figure 1A:
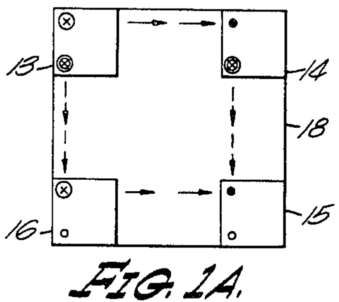
FIGURES 1A, 2A, 3A and 4A are views taken along lines 1A—1A; 2A—2A; 3A—3A and 4A—4A of FIGURES 1 through 4 respectively, with the winding removed for the sake of clarity.

As shown in FIGURES 1 and 1A, the magnetic circuit of the unidirectional flux generated by the direct current in the winding 20, indicated by the solid arrows, the solid dots and the X's surrounded by a single circle, includes two paths. The first of these paths is through the end region 17, the leg 16, the end region 18 and the leg 15 while the second is through the end region 17, the leg 13, the end region 18 and the leg 14. The magnetic circuit of the alternating flux, indicated by the broken arrows, the open dots and the X's surrounded by a double circle, generated as a result of the alternating current in the winding 19 also includes two paths; a first path through the end region 17, the leg 14, the end region 18 and the leg 15, and a second path through the end region 17, the leg 13, the end region 18 and the leg 16.

Of course, in each of the legs or common regions, there is only one flux having alternating and unidirectional components. However, for purposes of clarity in discussing the invention, these flux components will sometimes in this specification be referred to simply as fluxes. As can be seen, on the first half cycle of the alternating current, the unidirectional flux component and the alternating flux component are in additive relationship in the legs 13 and 15 but are in opposing relationship in the legs 14 and 16. Consequently, the permeability of the legs 14 and 16 is much greater than the permeability in the legs 13 and 15 and the reluctance in the legs 14 and 16 is lower than the reluctance in the legs 13 and 15. Of course, on the second half cycle of the alternating current, the flux components will be in opposition in the legs 14 and 15 and adding in the legs 14 and 16. On either half cycle, however, each alternating flux path will contain one additive leg and one subtractive leg. As the result of the additive flux components in the leg 15 and the subtractive flux components in the leg 14, the average permeability of the first path followed by the alternating flux is reduced and consequently the average inductance of the winding 19 is reduced. The average permeability of the second path followed by the alternating flux is also reduced because this path also includes one common region in which the flux components are in additive relationship. The average permeability of each path followed by the alternating flux is thus reduced and consequently the average inductance of the winding 19 is reduced. The core is preferably made symmetrical so that its operation will be identical on each half cycle of the alternating current.

Figure 2:
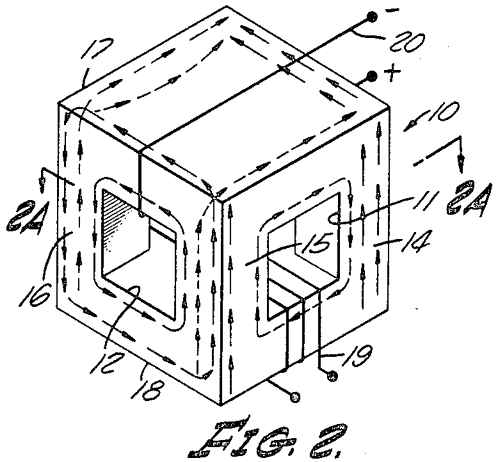
Figure 2A:
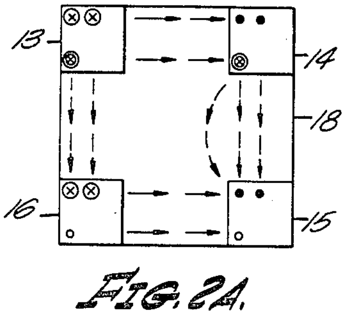

In FIGURES 2 and 2A, the direct current applied to the winding 20 has been increased with the result that more unidirectional flux is generated in the core. As a result of this increase in unidirectional flux, the legs 15 and 13 have an even lower permeability than was the case in FIGURE 1 and their reluctances are correspondingly higher. Some of the alternating flux passing from the leg 14 to the leg 15 may seek out paths of lesser reluctance and thus all of it may not follow a relatively straight line from the leg 14 to the leg 15 but rather some will "fringe" out to the central portion of the end region 18. Other known but not completely understood phenomena of magnetic circuit—such as the availability of magnetizability of magnetic domains will also contribute to this fringing effect. Since the flux which fringes out in this manner will cut the winding 20 in equal magnitudes but opposite directions, only a very small effective flux linkage is present between the winding 19 and the winding 20 and good isolation is maintained between them.

Figure 3:
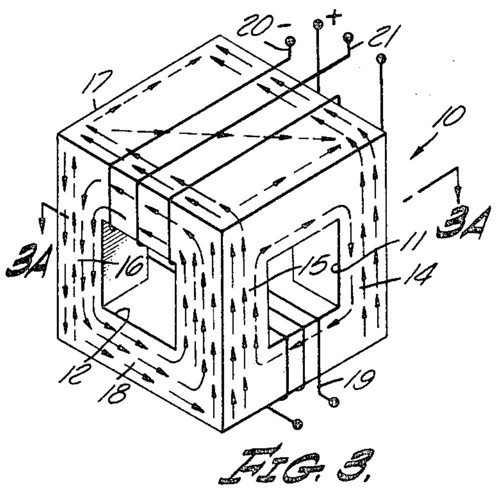
Figure 3A:
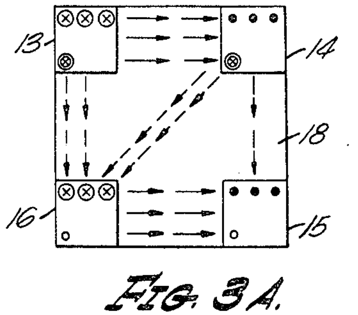

In FIGURES 3 and 3A, a third winding 21 has been wound around the end region 17 through the opening 12 so that its axis is parallel to the axis of the winding 20. This winding 21 acts as a secondary winding with the result that the device now acts as a variable transformer as a result of the varying inductance phenomena discussed above. As pointed out above, as the unidirectional flux in the core increases, the reluctance of the legs 13 and 15 get higher and higher and their permeability gets lower and lower. As pointed out above, the reluctance of a magnetic circuit is dependent both on its length and on its permeability. As the permeability of the leg 15 gets lower and lower, the reluctance of the magnetic path between the leg 14 and the leg 16 becomes less than the reluctance of the magnetic path between the leg 14 and the leg 15. Consequently, some of the flux leaving the leg 15 crosses over the end portion 18 and passes into the low reluctance portion of the leg 16.

This crossover flux cuts the winding 21 with the result that a voltage is induced therein. The crossover flux also cuts the winding 20 and induces a voltage in the winding; however, this voltage can be essentially eliminated by use of a suitable choke. It should be understood that there is no particular point in which the flux from the leg 14 crosses over to the leg 16 instead of going to the leg 15 but that rather this is a gradual process with more and more flux crossing over as the reluctance of the leg 15 gets higher and higher and that of leg 16 gets lower and lower. As previously pointed out, however, it appears that the greastest amount of energy transfer is due to the varying inductance phenomena and only to a limited degree to the action of the crossover flux.

It should be understood that if desired the functions of the control winding 20 and the secondary winding can be combined in a single winding to which is applied a DC bias or control signal and from which the output is taken.

Figure 4:
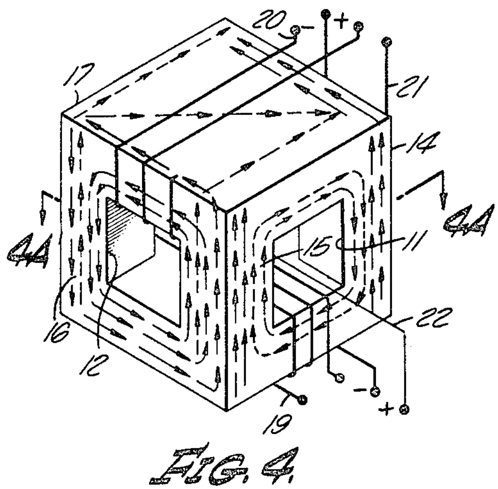
Figure 4A:
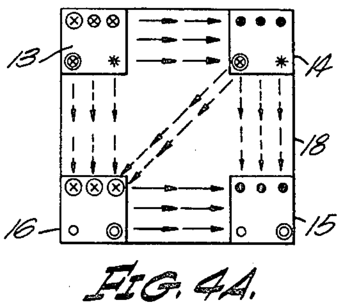

FIGURES 4 and 4A illustrate the operation of the device in the non-frequency doubling mode. In these figures, a primary bias winding 22 has been wound through the opening 11 and acts to generate a unidirectional flux in the paths followed by the alternating flux. If the level of the bias flux generated by the winding 22, indicated by the dotted arrows, the double X's and the double circles, is maintained higher than the maximum value the alternating flux attains, the inductance of the secondary winding is only maximized once each cycle with the result that no frequency doubling occurs.

Looking at FIGURES 4 and 4A from the crossover flux standpoint, it can be seen that the legs 14 and 16 will always be the low reluctance legs and consequently the crossover flux will always follow the path shown with the result that the voltage induced in secondary winding 21 will have the same frequency as the input to primary winding 19 as explained previously.

It may be helpful at this point to turn to FIGURES 5A, 5B, 5C and 5D to further an understanding of the principles of operation of the present invention. When no control or DC current flows in the winding 20, all of the magnetic legs 13, 14, 15 and 16 are unbiased from a magnetic standpoint and each leg operates at substantially the same point on its associated hysteresis loop since the magnetic flux in each leg is essentially identical in magnitude for all values of load current, i.e., the current through the winding 19, the only difference being that two legs will be operating on the negative portion of their hysteresis loops while the other two legs are operating on the positive portion of their loops. Therefore, in the practice case where the load current is supplied from an alternating current source, the locus of the operating points associated with each leg will be essentially identical and will trace out a pattern similar to that shown in FIGURE 5A for a complete cycle of load current. This curve is what is normally referred to as a normal operating hysteresis loop. In this case the load current will see a near maximum average inductance over the entire cycle because there is no magnetic biasing in any of the legs and thus each leg has its maximum or near maximum permeability. Each of these curves can be experimentally verified by means of hysteresisograph waveforms viewed upon an oscilloscope.

Let it now be assumed that a direct current is passed through the winding 20 with the result that a magnetic bias is established in each leg. This bias is indicated by the vertical dotted lines in FIGURES 5B and 5C. The hysteresis curve associated with the additive legs 13 and 15 is now similar to that shown in FIGURE 5B while the hysteresis curve associated with the subtractive legs 14 and 16 is similar to that shown in FIGURE 5C. As can be seen from these figures, each of these hysteresis curves makes its swing around the bias level. The composite hysteresis loop associated with the legs 14 and 15, that is, with the first path followed by the alternating flux is similar to that shown in FIGURE 5D. This hysteresis loop is made up primarily of the left side of the curve of FIGURE 5B and the right side of the curve of FIGURE 5C with the bias level set by the control current acting as the midpoint of the curve in each part of the curve.

Figures 5A, 5B, 5C, 5D, 6:
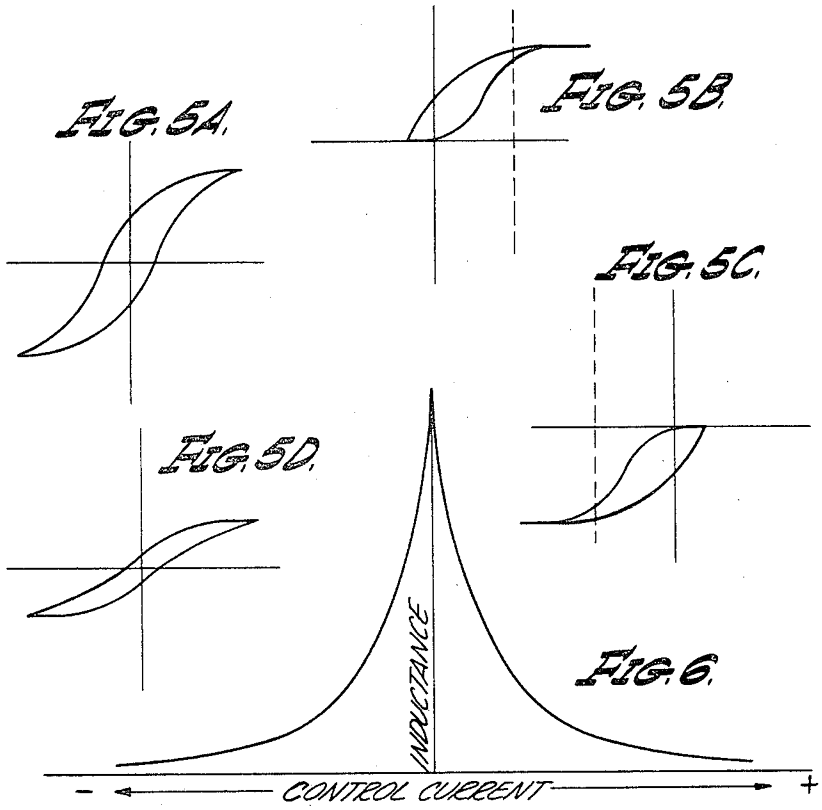
FIGURE 5A illustrates the magnetization curve of a flux path in the core shown in FIGURES 1 through 4 when only a single flux generating means is present.
FIGURES 5B and 5C show the magnetization curves of the individual legs of the core shown in FIGURES 1 through 4 through which pass two fluxes in opposing relationship during one-half cycle and an additive relationship during the other half cycle of an AC current.
FIGURE 5D shows the composite magnetization curve of the core shown in FIGURES 1 through 4 which includes one leg in which two independently generated fluxes are in opposing relationship and one leg in which the fluxes are in additive relationship during one-half cycle and vice versa during the other half cycle of the AC current.
FIGURE 6 shows the relationship between control current and inductance in a device constructed according to the present invention.

The shape of the curve in FIGURE 5D will be effected mainly by the leg having the highest permeability at any given time. This is, of course, only completely true if the permeability of one of the legs is very high compared to the other and thus becomes more the case for the load winding as the control current magnitude is increased to a high value. Because of the symmetry of the core in the preferred case, the average permeability of the material associated with leg 14 will be higher than that of leg 15 during one-half of the cycle of the load current, and vice versa during the other half cycle. This symmetry, in conjunction with the operation of the leg paths causes the hysteresis loop of FIGURE 5D to have its different characteristic shape and results in the load current seeing an average inductance over its cycle that is less than it saw when there was no control current. This is evident as the hysteresis loop of FIGURE 5D has effectively rotated somewhat clockwise as compared to the hysteresis loop of FIGURE 5A. A larger H on the average is now required for a specific value of B as the hysteresis loop effectively rotates clockwise.

As the control current is still further increased, the hysteresis loop is effectively rotated further and further clockwise until it is essentially horizontal. This indicates that the average permeability associated with the material linked by the load winding is very low compared to the no control current condition and, of course, in this case the variable inductance has a very low average inductance. This is the "saturated" condition for the inductor of the present invention since additional control current will cause a relatively small change in the average inductance that the load current will see over its cycle of operation.

A typical plot of the inductance of the load winding as a function of the control current is shown in FIGURE 6. As will be evident from the figure and from the previous discussion, the polarity of the control current is unimportant to the control of the device.

Figures 7, 8, 9:
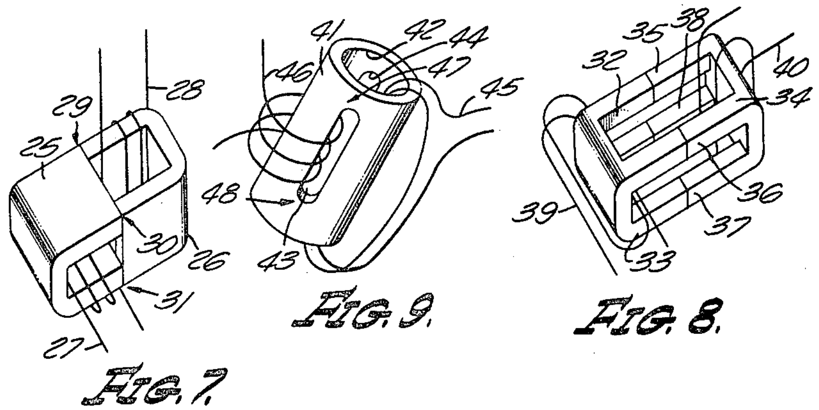
FIGURE 7 shows a second embodiment of the present invention.
FIGURE 8 shows a third embodiment of the present invention.
FIGURE 9 shows a fourth embodiment of the present invention.

FIGURES 7, 8 and 9 illustrate other core structures that could be used for either the variable inductor or the variable transformer of the present invention. As shown, they illustrate variable inductors; however, it will be obvious that a secondary winding could be added to convert their operation to that of a variable transformer as explained above. In FIGURE 7, a pair of C cores 25 and 26 are rotated 90° from each other and their bases joined together. The base of each C core 25 and 26 is preferably lapped very smooth so that the junctions of the cores are as perfect as possible and the presence of any air gap is minimized. A first winding 27 is wound on the core 25 while a second winding 28 is wound on the core 26. The common regions which the fluxes generated by both of the coils 27 and 28 traverse are shown generally at 29, 30 and 31. The fourth common region is, of course, at the other, hidden, junction of the cores 25 and 26. This then is a case where the "legs" have no structurally definable existence but in which they nevertheless have operative existence. The windings 27 and 28 are shown with their axes at right angles. This is preferable but not essential as the required flux paths will still be set up in the cores even if the coils are not at right angles. However, when the coils are not at right angles, the coupling between them is increased and thus the isolation of each coil from the other is not maximized.

The core of FIGURE 8 is very similar to that of FIGURES 1 through 4 and is constructed by forming slots 32 in C cores 33 and 34 similar to the cores 25 and 26 of FIGURE 7. The bases of the cores 33 and 34 are then lapped and joined together to form a structure with four legs or common regions 35, 36, 37 and 38. A winding 39 is wound on the core 33 and a winding 40 is wound on the core 34, preferably with their axes at right angles but not necessarily.

FIGURE 9 shows a tubular ferromagnetic core 41 having an axial passageway 42 and a pair of oppositely disposed radial slots 43 and 44. A first winding 45 is wound through the axial passageway 42 while a second winding 46 is wound through the slots 43 and 44. The fluxes generated by these two windings will have common regions at 47 and 48 and the similar areas on the opposite side of the core.

FIGURE 10 shows a variable frequency tuned L–C circuit using a variable inductor constructed according to the present invention. In this figure, the variable inductor 51 has its load winding 52 connected in parallel with a capacitor 53 to form a tuned L–C circuit which can be connected into any other suitable circuit by means of terminals 54 and 55.

The control winding 56 of the inductor 51 is connected across a potentiometer 57 which is in turn connected across the output of a DC power supply 58. As has been pointed out above, varying the DC current flowing through control winding 56 has the effect of varying the inductance of winding 52 and consequently will vary the frequency to which the L–C circuit including the winding 52 is tuned. Such a circuit would, for example, be extremely useful in tuning radios by means of varying the inductance instead of the conventional variation of the capacitance. Since the core of the inductor 51 can be made quite small, the size of such a radio could be reduced below that presently possible in radios using relatively large tuning capacitors. In addition, the use of this circuit would permit the radio to be tuned remotely as an electrical control rather than a mechanical control performs the tuning function.

FIGURES 11A, 11B and 11C shows schematically various cores in which the windings are generated such that their axes are not transverse. The positioning of the various legs or common regions in these figures is believed to be obvious and not to warrant extended discussion. Of course, the winding may also be wound non-transversely on the other cores illustrated if such is desired.

When reference is made in the claims to "the magnetic circuit" encompassed by a winding being non-saturated, this is not intended to imply that all portions of the core remain non-saturated. Further, the term "average inductance" has been used interchangeably with and to mean the same as "effective inductance."

The invention may be embodied in other specific forms not departing from the spirit or central characteristics thereof. The present embodiments are therefore to be considered in all respects as illustrative and not restrictive.

What is claimed is:

1. An electrical circuit comprising a magnetic core having four common regions and two end regions magnetically joining said common regions, a load winding wound on said core between the first and the fourth and the second and the third of said common regions, a control winding wound on said core between the first and second and third and fourth common regions; a capacitor connected in parallel with said load winding; said capacitor and said load winding in themselves forming a tuned L–C circuit; and means for supplying a control winding, variations in said control current causing variations in the inductance of said load winding without substantially distorting the waveform of an alternating current passed therethrough.

2. The circuit of claim 1 wherein said core comprises a tube of magnetic material having an axial opening therein and first and second radial slots formed in the walls thereof, one of said windings being wound through said axial opening and the other of said windings being wound through said radial slots.

3. The circuit of claim 1 wherein said control current is DC.

4. A system for tuning the frequency of an L–C circuit comprising: a magnetic core having four common regions and two end regions magnetically joining said common regions, a load winding wound on said core between the first and the fourth and the second and the third of said common regions, a control winding wound on said core between said first and said third and fourth common regions; a capacitor; means coupling said capacitor in parallel with said load winding, said capacitor and said load winding in themselves forming a tuned L–C circuit, said load winding serving as the inductance in said L–C circuit; a source of direct current; means for varying the magnitude of said direct current; and means connecting said direct current varying means to said control winding to supply a direct current thereto, variations in said direct current causing variations in the inductance of said load winding without substantially distorting the waveform of an alternating current passed therethrough whereby said L–C circuit may be tuned to different frequencies.

5. The circuit of claim 4 wherein said core comprises a tube of magnetic material having an axial opening therein and first and second radial slots formed in the walls thereof, one of said windings being wound through said axial opening and the other of said windings being wound through said radial slots.

6. An electrically tunable L–C network comprising: a magnetic core having four common regions and first and second portions joining said four common regions; a first winding wound on said core with its axis extending between said first and second common regions and between said third and fourth regions; a capacitor; means connecting said first winding and said capacitor in parallel relationship, said first winding and said capacitor in themselves forming a tuned L–C circuit; means for applying an alternating current to said capacitor and said first winding whereby an alternating current is passed through said first winding and an alternating magnetic flux is generated in said core; a second winding wound on said core with its axis extending between said first and fourth common regions and between said second and third common regions; a source of direct current; means for varying the magnitude of said direct current; means connecting said direct current varying means to said second winding whereby a direct current is passed through said second winding and a unidirectional magnetic flux is generated in said core, said unidirectional flux acting on the magnetic circuit encompassed by said first winding such that the average permeability of said magnetic circuit and the average inductance of said first winding are dependent on the magnitude of said direct current.

7. An electrically tunable L–C circuit comprising: a magnetic core; a first winding wound on said core; a capacitor; means connecting said first winding and said capacitor in parallel relationship, said first winding and said capacitor in themselves forming said L–C circuit; means for applying an alternating current to said capacitor and said first winding whereby an alternating current is passed through said first winding and an alternating magnetic flux is generated in said core, said alternating flux following first and second paths in said core; a second winding wound on said core; means for supplying direct current to said second winding; means for varying the magnitude of said direct current; said direct current passing through said second winding generating a unidirectional magnetic flux in said core, said unidirectional flux following third and fourth paths in said core; said first path sharing a first common region in said core with said third path and a second common region in said core with said fourth path, said second path sharing a third common region in said core with said third path and a fourth common region in said core with said fourth path, said fluxes being in opposing relationship in two of said common regions whereby the reluctance of said common regions is reduced, and in additive relationship in the other two of said common regions whereby the reluctance of said other two common regions is increased, each of said first, second, third and fourth paths including one opposing flux common region and one additive flux common region whereby the average permeability of each of said first and second paths and the average inductance of said first winding are dependent on the magnitude of said direct current.

8. An electrically tunable L–C circuit comprising: a magnetic core having four symmetrical legs and first and second portions joining said four legs; a first winding wound on said core; a capacitor; means connecting said first winding and said capacitor in parallel relationship, said first winding and said capacitor in themselves forming said L–C circuit; means for applying an alternating current to said capacitor and said first winding whereby an alternating current is passed through said first winding and an alternating magnetic flux is generated in said core, said alternating flux following a first path through said first portion, said first leg, said second portion and said fourth leg, and a second path through said first portion, said second leg, said second portion and said third leg; a second winding wound on said core; means for supplying direct current to said second winding; means for varying the magnitude of said direct current; said direct current passing through said second winding generating a unidirectional magnetic flux in said core, said unidirectional flux following a third path through said first portion, said first leg, said second portion and said second leg and a fourth path through said first portion, said fourth leg, said second portion and said third leg; said fluxes being in opposing relationship in said first and third legs and in additive relationship in said second and fourth legs during the first half cycle of said alternating current, and in opposing relationship in said second and fourth legs and in additive relationship in said first and third legs during the second half cycle of said alternating current whereby in either half cycle of said alternating current each of said first and second paths include one opposing flux leg and one additive flux leg whereby the average permeability of each of said first and second paths and the average inductance of said first winding is dependent on the magnitude of said direct current, the magnitude of said direct current being maintained such that said first and second paths substantially remain in the nonsaturated regions of their magnetization curves.

References Cited

UNITED STATES PATENTS

| | | | |
|---|---|---|---|
| 2,825,030 | 2/1958 | Altar et al. | 334—12 X |
| 2,897,352 | 7/1959 | Smith-Vaniz | 334—12 X |
| 3,351,860 | 11/1967 | Wolff | 334—12 X |

HERMAN KARL SAALBACH, Primary Examiner

PAUL L. GENSLER, Assistant Examiner

U.S. Cl. X.R.

334—61, 71